(12) United States Patent
Sullivan

(10) Patent No.: US 7,107,229 B1
(45) Date of Patent: Sep. 12, 2006

(54) APPARATUS AND METHOD FOR CREATING AND MANAGING A FINANCIAL INSTRUMENT

(75) Inventor: Gerald P. Sullivan, Summit, NJ (US)

(73) Assignee: Claremont Investment Partners, LLC, Summit, NJ (US)

( * ) Notice: Subject to any disclaimer, the term of this patent is extended or adjusted under 35 U.S.C. 154(b) by 0 days.

(21) Appl. No.: 09/624,732

(22) Filed: Jul. 25, 2000

Related U.S. Application Data

(60) Provisional application No. 60/181,718, filed on Feb. 11, 2000.

(51) Int. Cl.
    *G06Q 30/00* (2006.01)

(52) U.S. Cl. .............................. 705/26; 705/36; 705/37

(58) Field of Classification Search .................. 705/36, 705/26

See application file for complete search history.

(56) References Cited

U.S. PATENT DOCUMENTS

| | | | |
|---|---|---|---|
| 4,933,842 A | 6/1990 | Durbin et al. | |
| 5,101,353 A | 3/1992 | Lupien et al. | |
| 5,132,899 A * | 7/1992 | Fox .............................. | 705/36 |
| 5,193,056 A | 3/1993 | Boes | |
| 5,592,379 A | 1/1997 | Finfrock et al. | |
| 5,644,727 A | 7/1997 | Atkins | |
| 5,689,650 A | 11/1997 | McClelland et al. | |
| 5,745,706 A | 4/1998 | Wolfberg et al. | |
| 5,812,987 A | 9/1998 | Luskin et al. | |
| 5,819,238 A | 10/1998 | Fernholz | |
| 5,852,811 A | 12/1998 | Atkins | |
| 5,864,685 A | 1/1999 | Hagan | |
| 5,875,437 A | 2/1999 | Atkins | |
| 5,907,828 A | 5/1999 | Meyer et al. | |
| 5,911,135 A | 6/1999 | Atkins | |
| 5,913,198 A | 6/1999 | Banks | |
| 5,926,792 A | 7/1999 | Koppes et al. | |
| 5,999,917 A | 12/1999 | Facciani | |
| 6,049,772 A | 4/2000 | Payne et al. | |
| 6,064,986 A | 5/2000 | Edelman | |

(Continued)

FOREIGN PATENT DOCUMENTS

WO     WO 034911     6/2000

(Continued)

OTHER PUBLICATIONS

"Planners Must Tailor Mutual Fund Mix to Suit Client" Financial Services Week, Aug. 20, 1990. Author unknown.*

(Continued)

*Primary Examiner*—Wynn W. Coggins
*Assistant Examiner*—Jaime E. Zurita
(74) *Attorney, Agent, or Firm*—Akin Gump Strauss Hauer & Feld, LLP

(57) ABSTRACT

A method is disclosed for allocating a portfolio investment among a population of securities held in an investment portfolio, wherein each security of the population of securities is issued by a company of a plurality of companies, and each security has at least one corresponding data element. The method includes the steps of assigning each security to a corresponding industry group, summing the industry total of each of the plurality of industry groups to provide the portfolio investment. One investment portion of the portfolio investment is distributed to at least one or more of the plurality of industry groups. The investment portion of the corresponding industry group is equal to a proportion of the industry total of the corresponding industry group to the portfolio investment. The investment portion may be distributed among a selected one or more of the securities of the corresponding industry group.

16 Claims, 12 Drawing Sheets

Data Frame Phase (Universe Determination)

The Data Frame Phase determines the industries, companies, and time period to be included into the Model.
A different (of 13) edition is updated weekly by ValueLine and aggregated monthly by the model, so over a period of 3 months, all editions are updated.

U.S. PATENT DOCUMENTS

| | | | |
|---|---|---|---|
| 6,085,174 | A | 7/2000 | Edelman |
| 6,292,787 | B1 * | 9/2001 | Scott et al. ............... 705/36 R |
| 6,484,151 | B1 * | 11/2002 | O'Shaughnessy ......... 705/36 R |

FOREIGN PATENT DOCUMENTS

| | | |
|---|---|---|
| WO | WO 058900 | 10/2000 |
| WO | WO 073923 | 12/2000 |
| WO | WO 075836 | 12/2000 |

OTHER PUBLICATIONS

"Helping Employees Invest Wisely" HR Magazine, vol. 38, No. 11. p. 77-82, Nov. 1993. Keppler, Michael and Ranftle, Kenneth.*

Form N-1A/A for Industry Leaders Fund, SEC Files 333-62893, 811-08989, Accession No. 950130-98-5798, filed Dec. 4, 1998.*

The SEC Opens the Door. (Securities And Exchange Commission's Electronic Data Gathering Analysis Retrieval System), Castelluccio, Management Accounting (USA), v. 78, n. 1, p. 58(1), Jul. 1996; Internet/Dialog Dialog Accession No. 00193444; on Apr. 12, 2002.*

SEC Film File And Microfilm Dissemination, Sponsor: Securities & Exchange Commission, Procurement & Contracts Branch Nov. 1, 1984; retrieved from the Internet/Dialog Accession No. 0779144; accessed: Apr. 12, 2002.*

Computerizing Uncle Sam's Data: Oh, How The Public Is Paying, Frances Seghers, Business Week, Dec. 15, 1986; Internet/Dialog Accession No. 0025288; accessed: Apr. 12, 2002.*

Government Project Frees Up Access to SEC Data, Communications Daily , V 13 , N 205 , Oct. 25, 1993, Warren Publishing Inc.; Internet/Dialog Accession # 02206561; accessed: Apr. 12, 2002.*

SEC Adopts New Electronic System, Cynthia Williams, Electronic Banking & Finance , v. 6, n. 4, Jun. 1989, Publisher Elsevie Science, Inc.; Internet/Dialog Accession # 01109521; accessed: Apr. 12, 2002.*

Arthur Levitt Testimony, SEC chairman, The House Committee On Appropriations Subcom. On Commerce, Justice, And State The Judiciary, And Related Agencies Concerning Appropriations FY1997. May 9, 1996; Internet/Dialog Accession #00175957; accessed: Apr. 12, 2002.*

"Important Information About EDGAR" www.sec.gov/edgar/aboutedgar.htm last modified Jun. 28, 1999. accessed Apr. 9, 2002.*

"FTP Information on the EDGAR database" http://www.sec.gov/edgar/searchedgar/ftpusers.htm, Retrieved from the Internet on Apr. 17, 2002.*

"Claremont to manage new fund," Sep. 21, 1998, in Mutual Fund Market News, v. vi, n. 37, p. 20. ClaremontNewsLetter. Internet/Dialog accession No. # 2261569; accessed: Aug. 29, 2001.*

SEC index of documents filed by applicant Mar. 31, 1997-Aug. 29, 2001. Retrieved from the Internet www.secinfo.com on: Aug. 31, 2001.*

Industry Leasers Fund, Retrieved from the Internet from Dialog Information Services; Dialog Accession No. 03604903; date accessed: Apr. 17, 2002 (3 pages).*

And on WESTLAW® (loaded onto a database on Dec. 7, 1998 and copyrighted in 1998 by EDGARPlus®). Retrieved from WEWSTLAW® on Apr. 9, 2002.* ftp://ftp.sec.gov/edgar/full-index/1998/ QTR4/ contains SEC/fourth quarter/1998. Index Retrieved from the Internet from SEC ftp site; date accessed Apr. 12, 2002.*

HTML/<META>, http://www.w3.org/MarkUp/html-spec/html-spec_toc.html. Retrieved from World Wide Web Consortium site, on Apr. 12, 2002.*

EDGAR Screens. Downloaded from the Internet on Nov. 19, 2003. 16 pages.*

Form N-1A/A for Industry Leaders Fund, SEC Files 333-62893, 811-08989, Accession No. 1000579-99-34, filed Dec. 4, 1998, retrieved from the Internet on Aug. 30, 2001. pp. 1, 27-30, total of 5 pages.*

Harrell, David, Morningstar Style Universe, first quarter 1997, downloaded from the Internet on Dec. 28, 1999, 4 pages.*

"Bot's Will Make Banks Rethink Their Practices", American Banker.

"NEC Reforms Emphasize Net, Independence for Divisions", Nikkei Weekly.

"What's Next—A Patent for The 401(k)?", Business Week.

"Investment Platform Shrinks Pension Plan Paperwork, Expense", Corporate Cashflow.

"Real-time Pricing Yields Timelier Trust Services", Wall Street Computer Review.

"Not-for-profit Fund Accounting System Executive Data Systems, Inc. (Software Review)", Hospital Financial Management.

"Construction of Computer-Aided System of Account of Operation in Stock Market With Use of Network Processes", Grey Literature in Europe: SGL.

EDGAR Online Introduces EDGARpro Legal, Nov. 15, 2002.

LexisNexis Offers SEC Data and Tools from EDGAR Online Available via www.lexis.com and www.nexis.com, Nov. 20, 2002.

EDGAR Online and UBmatrix to Create Global XBRL Database, Sep. 19, 2002.

EDGAR Online and UBmatrix Enter Joint Venture to Develop the First Global XBRL Data Exchange, EDGAR Analyst powered by Ubmatrix, Aug. 22, 2002.

EDGAR Online Posts CEO/CFO Compliance Scorecard; Certification of Financial Statements Available Across Services, Aug. 14, 2002.

EDGAR Online Adds International Company Data Coverage on 13,300 Companies in 45 Countries Available Across Services, Aug. 12, 2002.

EDGAR Online, Inc. Launches and XBRL Repository for Financial Statements Tagged in XBRL, Dec. 31, 2001.

EDGAR Online, Inc. and Sector Data and Team to Enhance Customer Experience by Offering Access to SEC Filings on Sectorbase, Nov. 5, 2001.

EDGAR Online creates Repository for Financial Statements Tagged in XBRL, Dec. 4, 2000.

EDGAR Online Acquires EDGAR News Service from Internet Financial Network, Oct. 18, 2000.

EDGAR Online, Inc. Launches Fair Disclosure Site, Oct. 17, 2000.

EDGAR Online to Provide SEC Data Service to OneSource Information Services, Inc., Jun. 19, 2000.

EDGAR Online Launches Redesigned Web Site, Jun. 7, 2000.

FreeEDGAR Introduces Free Full Text Search Tool, May 1, 2000.

EDGAR Online Introduces Full Text Search, Apr. 26, 2000.

EDGAR Online Joins Global Initiative In Launching XBRL, a New Specification that Exchanges Financial Reports Across All Technologies, Including the Internet, Apr. 6, 2000.

EDGAR Online Offers Wireless Access to IPO Express, Mar. 13, 2000.

EDGAR Online to Develop Proprietary News Product for ILX Systems, Inc., Feb. 15, 2000.

More Powerful IPO Express Service Introduced by EDGAR Online, Feb. 8, 2000.

EDGAR Online Introduces Natural Language Business Plan Analysis & Development Tool, Dec. 1, 1999.

EDGAR Online, Inc. to Acquire FreeEDGAR.com, Jul. 26, 1999.

High-Speed, On-Demand Printing for SEC Documents Available from EDGAR Online, Jul. 21, 1999.

Welcome! You've Got SEC Filings!, Feb. 18, 1999.

EDGAR Online (www.edgar-online.com) Powered by Gateway, Feb. 23, 1998.

Real-Time SEC Filings Now Viewable in Microsoft Word, According to Cybernet Data Systems, Jul. 21, 1997.

McDonald, Duff, "Unscrambling EDGAR", Money, Jun. 1999, 175-177.

"BakBone Software Announces U.S. Securities and Exchange Commission Registration Complete", M2 Presswire, Feb. 27, 2002.

"Sports Group International Inc. Files Form 10-SB with the U.S. Securities and Exchange Commission", Business Wire, Dec. 20, 1999, 0524.

"Humatech Inc. Announces Filing of Form 10-SB With U.S. Securities and Exchange Commission", Business Wire, Dec. 17, 1999, 0271.

"FastComm Reports Second Fiscal Quarter Results", Business Wire, Dec. 15, 1998.

"BakBone Software Enters Into OEM Agreement with Sony Electronics Inc.", Business Wire, Jan. 23, 2003; 1.

Tascarella, Patty, "The Evolution of An Investor", Pittsburgh Business Times Journal, Jan. 24, 2003, 11.

"BakBone Software Announces Fourth Quarter Fiscal 2002 Financial Results", Business Wire, Jun. 14, 2002; 0055.

"Fastcomm Communications Corporation Announces Private Financing Agreement for $3 Million", Business Wire, May 23, 2001; 2514.

"Delphi Automotive Systems Files Proxy Statement, Issues Annual Report", Newswire, Mar. 31, 2000, 6082.

"Global Cyber Sports.com—Comments on Listing and OTCBB Trading Status", Business Wire, Apr. 10, 2000; 1137.

"John Wyatt Joins OneSoft as President and Chief Operating Officer", Business Wire, Mar. 27, 2000; 1496.

* cited by examiner

The Data Frame Phase determines the industries, companies, and time period to be included into the Model.
A different (of 13) edition is updated weekly by ValueLine and aggregated monthly by the model, so over a period of 3 months, all editions are updated.

Model Mechanics

Variable Definitions:
F = Monthly investment factor (allocation)
Pb = Price at beginning of month
Pe = Price at end of month
$I_n$ = Industry(n)
$C_z$ = Company(z)
j = number of Industries
k = number of companies within Industry
InCz = Company z within Industry n
BMValue = Value of Strategy model at end of preceding month (value of 1000 12/31/86)

Value of individual investments at the beginning of the month $$\sum_{n=1}^{j} [\sum_{z=1}^{k} F(InCz) BMValue ]$$

Value of Strategy Model at the end of the month $$\sum_{x=1}^{j} [\sum_{z=1}^{k} ( F(InCz) BMValue / Pb(InCz) ) Pe(InCz) ]$$

Figure 9 note: For the majority of the industries, k equals 1. Most industries have only one representative. Please refer to the 12/31/99 industry list found in Figure 10.

|  |  | Dec99 Factor | (%) GL 12/31/99 |
|---|---|---|---|
| Advertising | Interpublic Group Cos. Inc. | 0.13% | 22.74% |
| Aerospace/Defense | Boeing Co. | 1.31% | 2.00% |
| Air Transport | AMR Corp | 0.99% | 10.06% |
| Apparel | VF Corporation | 0.31% | 1.15% |
| Auto & Truck | Ford Motor Company | 1.55% | 5.57% |
| Auto Parts OEM | Delphi Automotive Systems | 0.33% | -0.98% |
| Auto Parts OEM | Magna International Inc. | 0.33% | -3.00% |
| Auto Parts Replacement | Genuine Parts Co. | 0.12% | -2.63% |
| Auto Parts Replacement | Tenneco Automotive Inc. | 0.12% | 18.25% |
| Bank | Bank of America Corp. | 2.25% | -13.50% |
| Bank | Chase Manhattan Corp. | 2.25% | 0.57% |
| Bank | Wells Fargo Company | 2.25% | -13.04% |
| Bank | Bank One Corp. | 1.70% | -8.03% |
| Beverage (Alcoholic) | Seagram Co. Ltd. | 0.65% | 2.73% |
| Beverage (Soft Drinks) | Coca-Cola Co. | 0.73% | -13.46% |
| Building Materials | Masco Corp. | 0.27% | 0.00% |
| Cable TV | Comcast Corp. | 0.13% | 11.89% |
| Cement & Aggregates | Lafarge Corp. | 0.19% | 2.31% |
| Chemical - Basic | Du Pont (E.I.) de Nemours | 0.77% | 10.83% |
| Chemical Diversified | Minnesota Mining & Mfg Co | 0.78% | 2.42% |
| Chemical Specialty | Rohm & Haas Co. | 0.78% | 13.12% |
| Computer and Peripherals | International Business Machines Corp. | 2.25% | 4.67% |
| Computer and Peripherals | Hewlett-Packard Co | 1.21% | 20.06% |
| Computer Software & Services | Microsoft Corp. | 2.25% | 28.23% |
| Computer Software & Services | Electronic Data Systems | 0.24% | 4.08% |
| Diversified | Tyco International Ltd. | 1.87% | -2.62% |
| Drug | Merck & Co., Inc. | 2.25% | -14.25% |
| Drug | Bristol-Myers Squibb Co. | 0.14% | -12.07% |
| Drug | Pfizer Inc. | 0.14% | -11.43% |
| Drugstore | Walgreen Co. | 0.33% | 0.43% |
| Educational Services | Sylvan Learning Systems Inc. | 0.05% | -1.42% |
| Electric Utility Central | Texas Utilities Co. | 2.17% | 0.98% |
| Electric Utility East | Southern Co. | 2.25% | 0.53% |
| Electric Utility East | Duke Energy Corp. | 0.46% | -1.11% |
| Electric Utility West | PG&E Corp. | 1.07% | -7.04% |
| Electrical Equipment | General Electric Company | 2.16% | 19.24% |
| Electronics | JDS Uniphase Corp. | 0.76% | 41.04% |
| Entertainment | Walt Disney (Hldgs) Co | 2.25% | 4.93% |
| Entertainment | Viacom Inc. | 0.14% | 21.48% |
| Environmental | Waste Management Inc. | 0.27% | 1.48% |
| Financial Services Diversified | American International Group | 2.25% | 4.22% |
| Financial Services Diversified | Citigroup Inc. | 2.25% | 3.36% |
| Financial Services Diversified | American Express Company | 0.53% | 10.03% |
| Financial Services Diversified | Loews Corp. | 0.53% | -5.18% |
| Food Processing | Unilever N.V. | 1.68% | 0.00% |
| Food Wholesalers | Supervalu Inc. | 0.16% | 2.89% |
| Furniture/Home Furnishings | Leggett & Platt Inc. | 0.20% | 0.00% |
| Gold/Silver Mining | Barrick Gold Corp. | 0.27% | -1.74% |
| Grocery Store | Albertson's Inc. | 0.63% | 0.78% |
| Healthcare Information Systems | IMS Health Inc. | 0.06% | 15.38% |
| Home Appliance | Whirlpool Corp. | 0.12% | 6.66% |
| Homebuilding | Centex Corp. | 0.27% | 4.12% |

Figure 10a

| | | | |
|---|---|---|---|
| Hotel/Gaming | Park Place Entertainment Corp. | 0.48% | -2.91% |
| Household Products | Procter & Gamble Co. | 0.79% | 1.45% |
| Industrial Services | Autonation Inc. | 0.64% | -0.67% |
| Insurance - Life | AXA Financial Inc. | 1.09% | 1.19% |
| Insurance - Property & Casualty | Berkshire Hathaway Inc. | 2.25% | -1.88% |
| Insurance - Property & Casualty | Allstate Corp. | 2.05% | -8.11% |
| Internet | At Home Corp. | 0.65% | -11.60% |
| Machinery | Caterpillar Inc. | 1.16% | 1.48% |
| Manufactured Housing / RV | Clayton Homes Inc. | 0.10% | -9.66% |
| Maritime | Alexander & Baldwin Inc. | 0.07% | 0.27% |
| Medical Services | Aetna Inc. | 1.63% | 2.17% |
| Medical Supplies | Johnson & Johnson | 1.83% | -10.12% |
| Metal Fabricating | Illinois Tool Works | 0.34% | 4.62% |
| Metals & Mining | Alcoa Inc. | 0.70% | 26.72% |
| Natural Gas Distribution | KeySpan Corporation | 0.41% | -9.29% |
| Natural Gas Diversified | Enron Corp. | 1.09% | 16.58% |
| Newspaper | Gannett Co. Inc. | 0.55% | 14.27% |
| Office Equipment & Supply | Xerox Corp. | 0.60% | -16.39% |
| Oilfield Services | Schlumberger Ltd. | 1.10% | -7.24% |
| Packaging & Container | Crown Cork & Seal Co. Inc. | 0.38% | 9.82% |
| Paper & Forest Products | International Paper Co. | 1.52% | 7.92% |
| Petroleum Integrated | Exxon Mobil Corp. | 2.25% | 1.58% |
| Petroleum Integrated | Royal Dutch Petroleum Company | 2.25% | 4.42% |
| Petroleum Integrated | Chevron Corporation | 1.01% | -2.19% |
| Petroleum Producting | Burlington Resources Inc. | 0.33% | -1.26% |
| Precision Instrument | Eastman Kodak Co. | 0.37% | 7.07% |
| Publishing | McGraw-Hill Companies Inc. | 0.23% | 8.71% |
| Railroad | Burlington Northern Santa Fe Corp. | 1.25% | -15.97% |
| Recreation | Carnival Corp. | 0.61% | 8.36% |
| REIT | Equity Residential Props TR | 0.61% | 8.11% |
| Restaurant | McDonald's Corp. | 0.61% | -11.87% |
| Retail Building Supply | Home Depot Inc. | 0.59% | 30.23% |
| Retail Special Lines | Toys R US Inc. | 1.05% | -18.21% |
| Retail Store | Wal-Mart Stores Inc. | 2.25% | 20.04% |
| Retail Store | Penney (J.C.) Co. | 0.21% | -10.64% |
| Securities Brokerage | Morgan Stanley Dean Witter & Company | 1.87% | 18.34% |
| Semiconductor | Intel Corp. | 2.25% | 7.33% |
| Semiconductor | Motorola Inc. | 0.09% | 26.29% |
| Semiconductor Capital Equipment | Applied Materials Inc. | 0.20% | 30.02% |
| Shoe | Nike Inc. | 0.17% | 8.01% |
| Steel (Integrated) | USX-U.S. Steel Group Inc. | 0.20% | 30.37% |
| Steel General | Nucor Corp. | 0.20% | 8.93% |
| Telecommunications Equipment | Lucent Technologies Inc. | 1.22% | 1.35% |
| Telecommunications Service | AT&T Corp. | 2.25% | -8.67% |
| Telecommunications Service | Bell Atlantic Corp. | 2.25% | -3.48% |
| Telecommunications Service | MCI Worldcom Inc. | 2.25% | -3.74% |
| Telecommunications Service | SBC Communications Inc. | 1.55% | -7.38% |
| Textile | Springs Industries Inc. | 0.11% | 0.67% |
| Thrift | Fannie Mae | 1.63% | -6.29% |
| Tire & Rubber | Goodyear Tire & Rubber Co. | 0.19% | -16.85% |
| Tobacco | Philip Morris Companies Inc. | 0.79% | -10.55% |
| Toiletries/Cosmetics | Gillette Company | 0.19% | 2.65% |
| Trucking & Transport Leasing | Hertz Corp. | 0.32% | 18.46% |
| Water Utility | American Water Works Inc. | 0.10% | -16.87% |

Figure 10b

APPARATUS AND METHOD FOR CREATING AND MANAGING A FINANCIAL INSTRUMENT

CROSS-REFERENCE TO RELATED APPLICATIONS

This application claims the benefit of U.S. Provisional Application No. 60/181,718 filed Feb. 11, 2000, entitled "APPARATUS AND METHOD FOR CREATING AND MANAGING A FINANCIAL INSTRUMENT."

BACKGROUND OF THE INVENTION

Equity mutual funds of all shapes and sizes tend to have one thing in common. Greater than 95% of equity mutual funds are managed by an individual Portfolio Manager or Investment Committee and would be considered "actively" managed. The remaining majority of funds would be considered "passively" managed index funds. An index fund uses the same representative portfolio as the published index it seeks to replicate. The majority of equity indexes that are published are weighted by market capitalization (the market price of a stock times shares outstanding). Market capitalization weighted indexes differ only by their universe selection. By gate-keeping an index universe, committees responsible for an index exclude certain component equities from their sample to maintain a predetermined portfolio characteristic of price/earnings ratio and price to book ratio. Our invention, The Industry Leaders Strategy Model was developed to generate portfolios based on the same universe, but using different ingredients to determine the weightings. Our process creates portfolios that have different portfolio statistics that are determined by the weighting factor and not a predetermined outcome. We developed a unique methodology for weighting portfolios by different fundamental inputs.

There are a small number of proprietary "model" based mutual funds that because of their secretive nature are as variegated as the actively managed funds. This invention has the same goal as these proprietary models (to be differentiated from actively managed funds by association to a discipline), yet this invention attempts to use a rigid and unique methodology to achieve the creation of understandably allocated portfolios.

SUMMARY OF THE INVENTION

It is an object of this invention to provide a method for the creation of portfolios of equity securities that does not require active management.

It is an object of this invention to provide a method of investment allocation based upon the data elements of the securities included within the investment portfolio.

In accordance with these and other objects of this invention, there is disclosed a method of allocating a portfolio investment among a population of securities held in an investment portfolio, wherein each security of the population of securities is issued by a company of a plurality of companies, and each security has at least one corresponding data element. The method includes the steps of assigning each security to a corresponding industry group, summing one of the corresponding data elements of each of the securities assigned to said corresponding industry group to provide an industry total for the corresponding industry group, and summing the industry total for each of the plurality of industry groups to provide the portfolio investment. Finally, a one investment portion of the portfolio investment is distributed to at least one or more of the plurality of industry groups.

In a further aspect of this invention, at least some of the population of securities is updated on a periodic cycle. Further, the plurality of securities are subdivided into a plurality of editions, wherein each edition is updated on a cycle that is staggered from the cycles of the other editions.

In a still further feature of this invention, the investment portion of the corresponding industry group is equal to a proportion of the industry total of the corresponding industry group to the portfolio investment. Further, the investment portion is distributed among a selected one or more of the securities of the corresponding industry group. In one embodiment of this invention, the investment portion is distributed to at least that security of the corresponding industry group that has the largest data element of the securities assigned to the corresponding industry group. In a further embodiment, two or more parts of the investment portion are allocated to two or more of the securities of the corresponding industry group that have the largest data elements.

In a still further aspect of the invention, the part of the investment portion allocated to a single security is set to not exceed a predetermined amount.

BRIEF DESCRIPTION OF THE DRAWINGS

FIG. 1 builds a frame broken down by industry that includes all companies to be aggregated by the invention.

FIG. 9 illustrates the model mechanics in an algebraic expression.

FIGS. 10a and 10b illustrate an example of this invention's portfolio for the data element of common shareholders equity.

DETAILED DESCRIPTION OF THE INVENTION

The following example describes an illustrative embodiment of this invention with common shareholders equity as a selected data element input. Each application of the invention (using different data element inputs) creates a different investment strategy.

This illustrative embodiment produces a principal investment strategy that invests in a broad number of industries and companies with the highest common stockholders' equity in their respective industries and produces a portfolio of approximately 95 to 110 companies that can be systematically managed to replicate the specified investment allocations.

Figure 1:
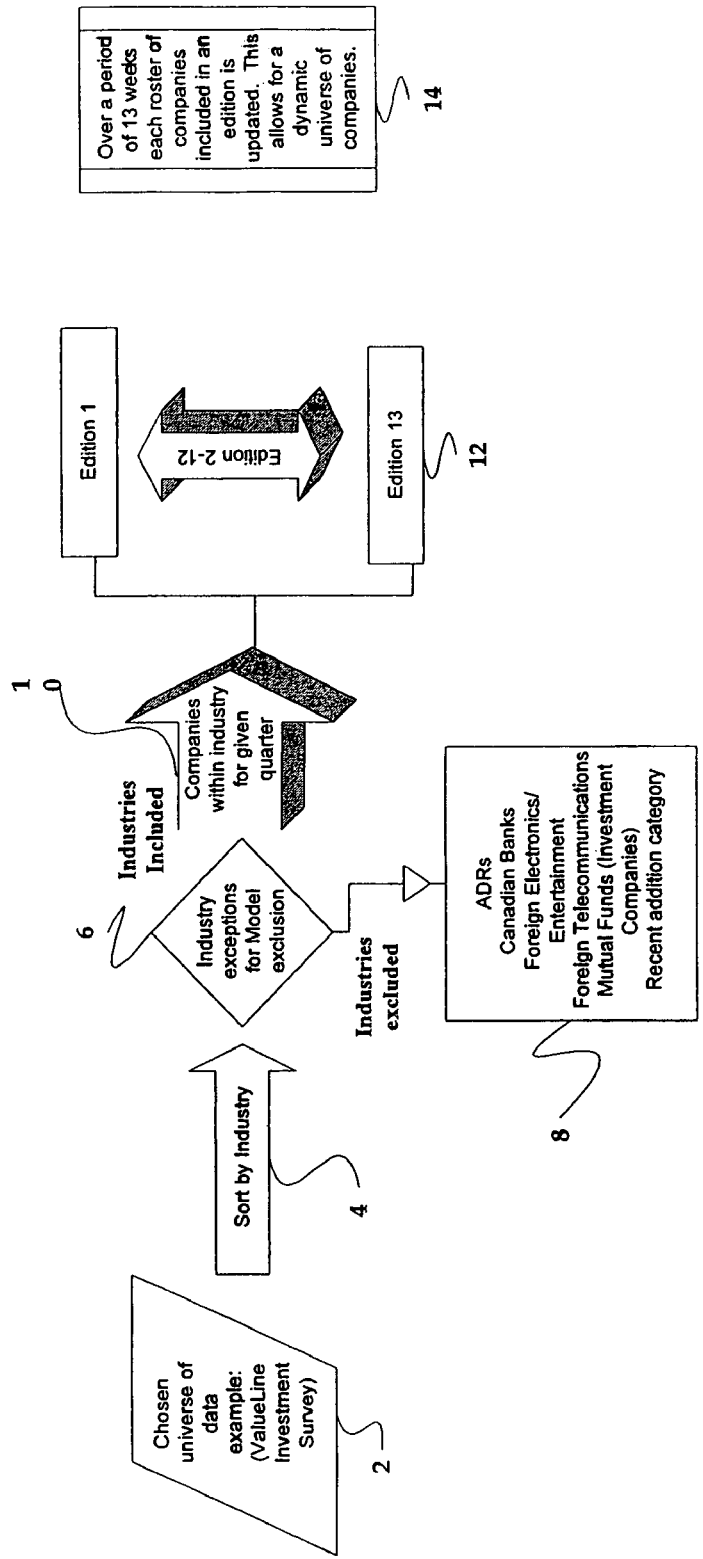
FIG. 1 illustrates how the universe of equities is determined for all applications of this invention. There are common exclusions to the chosen universes that are predetermined.

Referring now to FIG. 1, there is shown data that is brought into the data processing system of this invention. Utilizing a public, published universe of equities, we sort the equities into their primary industries and prepare the system to incorporate data. Imported data can be incorporated from any known source including, among others, STANDARD & POORS COMPUSTAT®, THE VALUE LINE INVESTMENT SURVEY® and BLOOMBERG®. For this illustrative embodiment of the data processing system, we have chosen to illustrate our data processing system using the VALUE LINE INVESTMENT SURVEY® ("VALUE LINE®") found in step 2. VALUE LINE® lists approximately the 1,700 of the largest publicly traded companies and classifies each company into an industry category, and is a good source to provide the contents of industries and representative companies for the previous 14 years. This established a fluid universe of equities to which we apply the data processing system. Step 4 sorts the industries and companies within each industry and formats them in a way that allows the data processing system to allow the universe to be refined.

To differentiate portfolios into international or domestic the invention using step 6 may exclude any population of equities or industries that an investment manager may choose in order to create a desired portfolio. Step 8 embodies an example of exclusions that are used for this illustration. The invention excludes from this illustrative example companies that are in the following foreign industries: Canadian Banks, Canadian Energy, Foreign Electronics/Entertainment and Foreign Telecommunications. VALUE LINE® publishes some data on investment companies which are excluded (closed-end domestic, foreign models, and income funds). We exclude from the universe companies whose shares are not directly traded in the United States (e.g., American Depository Receipts, commonly referred to as "ADRs"). Finally, the present system excludes from the universe companies included in VALUE LINE® as "miscellaneous" but which have not yet been assigned an Industry category because the invention does not assign industry categorization. The portfolio created from steps 6 and 8 will include domestic multinational corporations, but a smaller number of foreign companies, which do not have the same data reporting requirements as domestic corporations.

Step 10 uses the universe "update cycle" to determine how often changes are made to a given industry. An update cycle is the frequency to which the universe is modified by the publisher. Value Line changes their industry compositions every 3 months (1 quarter) and the cycle is set to 1 quarter. STANDARD and POORS® and BLOOMBERG® have different update cycles so step 10 would be different for these universes. In establishing this example universe of stocks, the invention also adjusts the Industry category of "Banks" to include "Banks Midwest" so as to unify the banking Industry analysis. Step 12 sorts the companies into the editions (weekly updates, numbering 13) found in Value Line which allows for an organized presentation of data from this data processing system. Step 14 highlights the update cycle found in the universe and this illustrative example describes the weekly update found in Value Line's quarterly update cycle. Industries and companies are included in this invention only for the periods during which they are published in the chosen universe by step 12.

Figure 2:
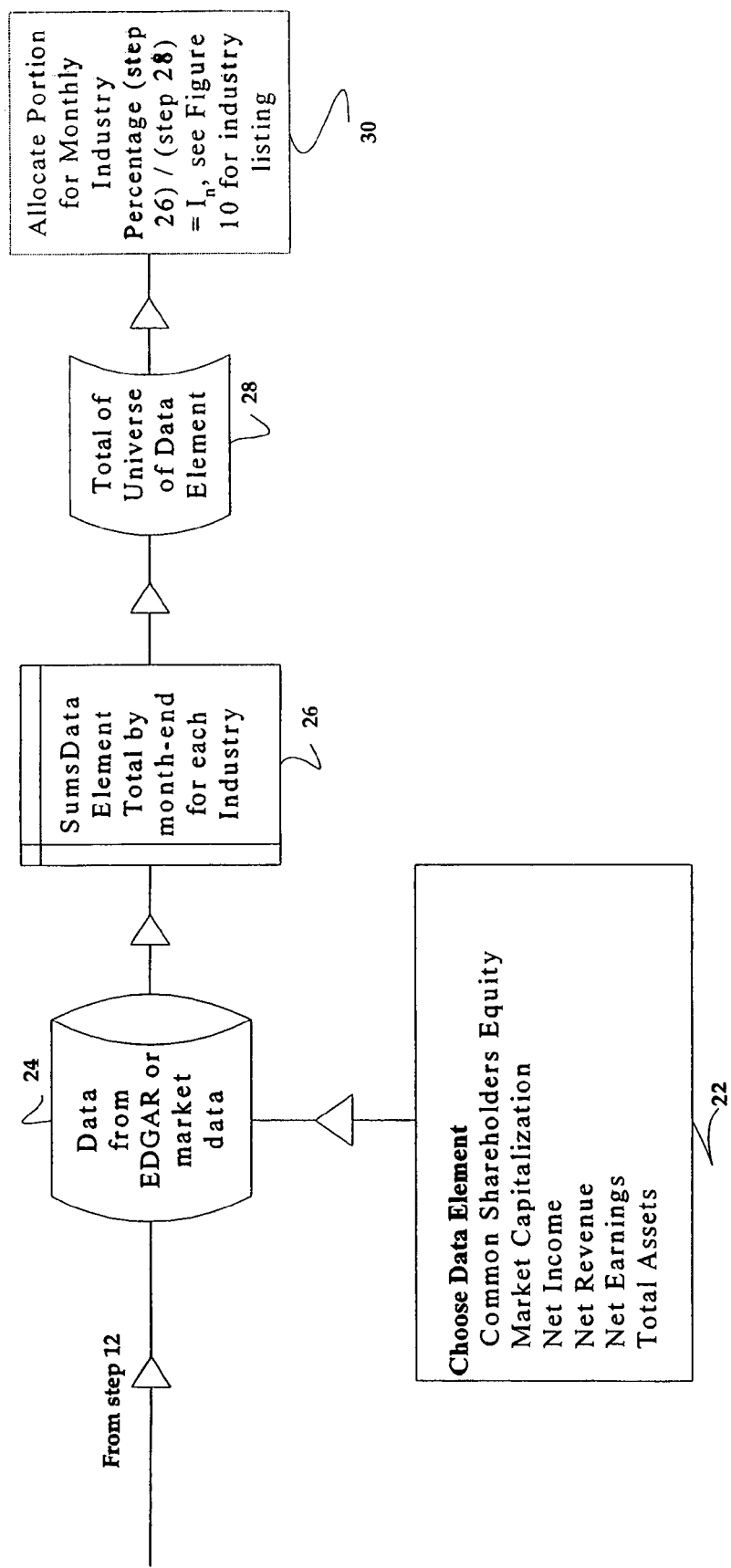
FIG. 2 illustrates how different data elements are used to create a universe aggregation that generates the portfolio allocation for a given industry. As different data elements are intruded into the process, different investment allocations by industry are created.

FIG. 2 illustrates how a chosen data element is incorporated into the refined universe found in step 12. The invention has the ability to use any published data element for a public corporation. A data element is an input to which the data processing system is applied. Step 22 illustrates potential data elements such as market capitalization and net income, but is not a complete list of potential data inputs. Each data element that is applied to the invention produces a different investment style and therefore a different portfolio. Publicly available data is acquired, for example, electronically from the EDGAR database of the SEC for fundamental data elements like common shareholders equity, net income, net revenue, net earnings and total assets. A market data source such as Bloomberg is used to provide market capitalization data. The illustrative embodiment presented here uses common shareholders equity to produce a "Large Capitalized Value Styled Portfolio." Step 24 acquires the chosen data element and imports the data into this data processing system.

Step 26 totals the data elements for all companies included in an industry for each month and step 28 totals the data elements for the selected universe. Finally, step 30 allocates an industry investment, which is calculated from the industry total divided by the universe total as determined in step 28. This investment allocation is created on a systematic basis, e.g., monthly, and is denoted by variable $I_N$.

Figure 11:
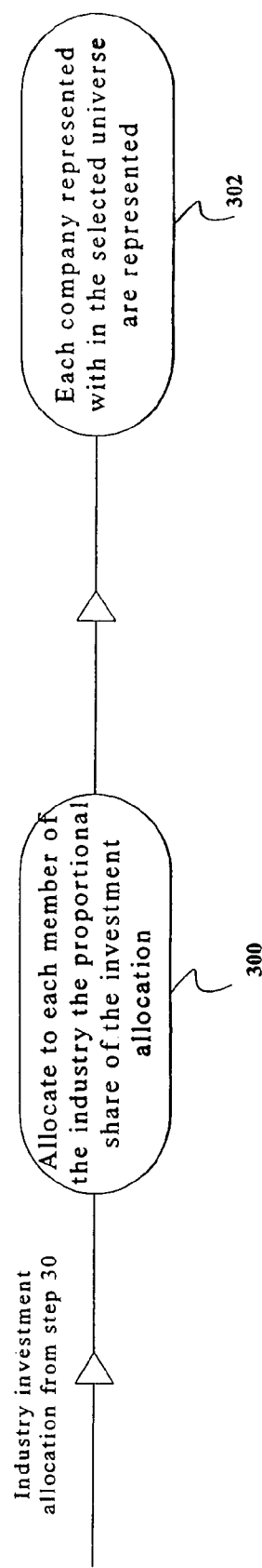
FIG. 11 illustrates the allocation of an investment share to each security of an industry.

There are many ways to assign an investment allocation to an individual equity and create a unique portfolio. With the industry previously defined and a data element chosen, the individual investment allocation process can use one of 2 allocation options. An investment manager may choose to maintain a portfolio with a manageable number of equities (less than 200), or he can choose to have all industry members represented by their prominence with regard to the total industry amount (individual percent of data element with regard to the specific industry). The first method is illustrated in FIGS. 3 through 8 and the second method is illustrated in FIG. 11.

The number of securities to which an industry investment or allocation is made depends on the size of the industry allocation. The size of the industry's investment allocation determines how many representatives are used. Therefore to create a portfolio, the data processing system applies a redundant iteration for each included industry of the defined universe. In choosing this allocation method, the investment manager would determine the maximum limit for the portfolio. FIGS. 3 through 8 illustrate the individual allocation limit to any one security is 2.25%. The example of 2.25% would limit an individual equity's portfolio representation to 2.25% of the total portfolio. By definition, the company with the largest data element for the given month would receive all of the industry's allocation determined by step 30.

Figure 3:
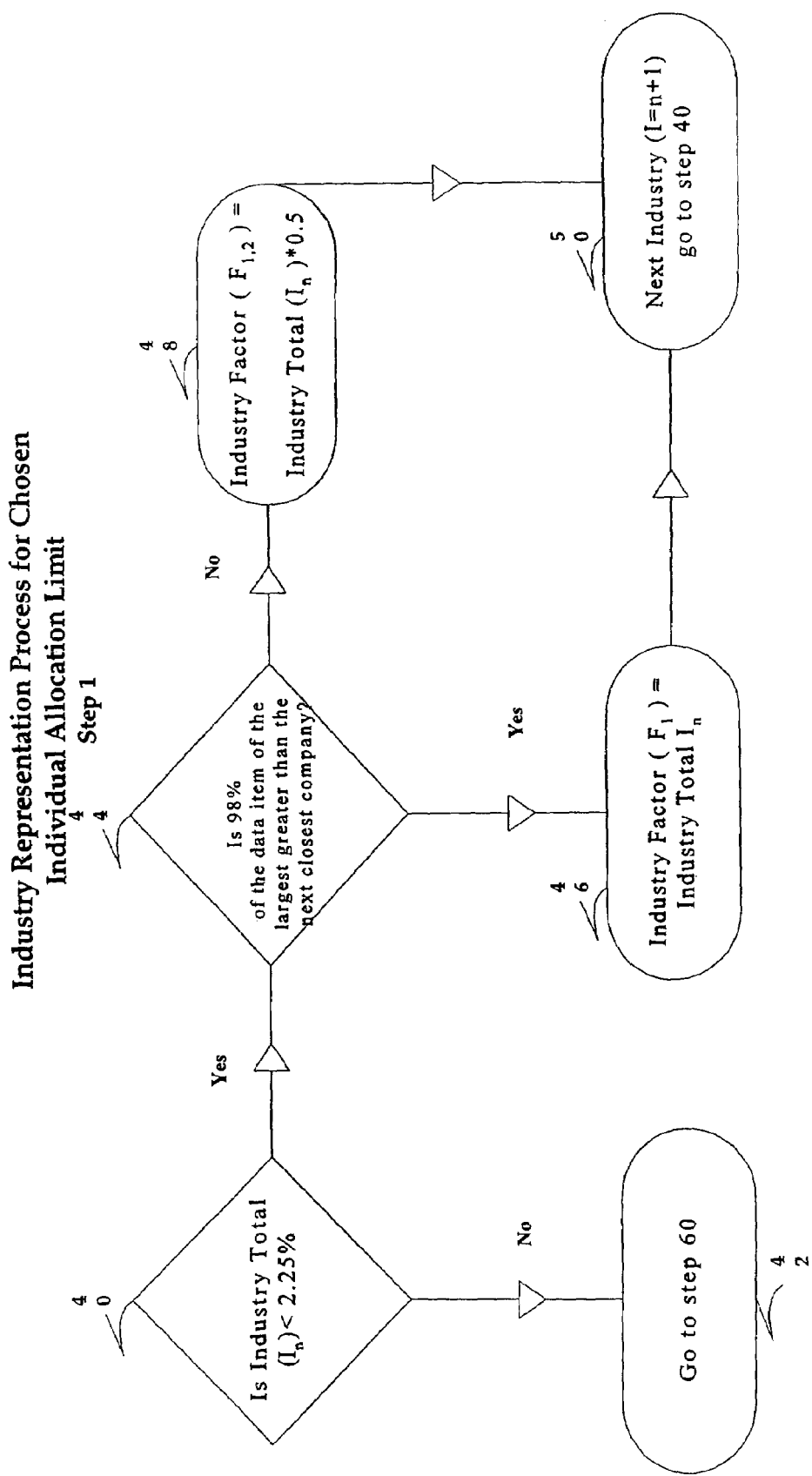
FIGS. 3–8 illustrate how an industry is represented by a unique set of leaders. This process has 6 steps of iteration available per industry. A fixed monthly allocation is created for each company that represents its industry.

As shown in FIG. 3, the process looks to determine the size of the industry in step 40. When the industry's allocation amount is below the 2.25% value, the process continues to step 44. If the industry is larger than 2.25% then step 42 directs the process to step 60. To determine the way a statistical tie would be broken, the data processing system allows for a significance test between the company with the largest data element and the next largest company. Step 44 illustrates a 2% value to determine if a statistical tie would be present and if so step 48 would split the allocation between the first 2 representatives of the industry. Step 46 would be used if no defined statistical tie is present, and the largest representative would be allocated the entire amount of the industry allocation. Step 50 takes the next industry back to step 40.

Figure 4:
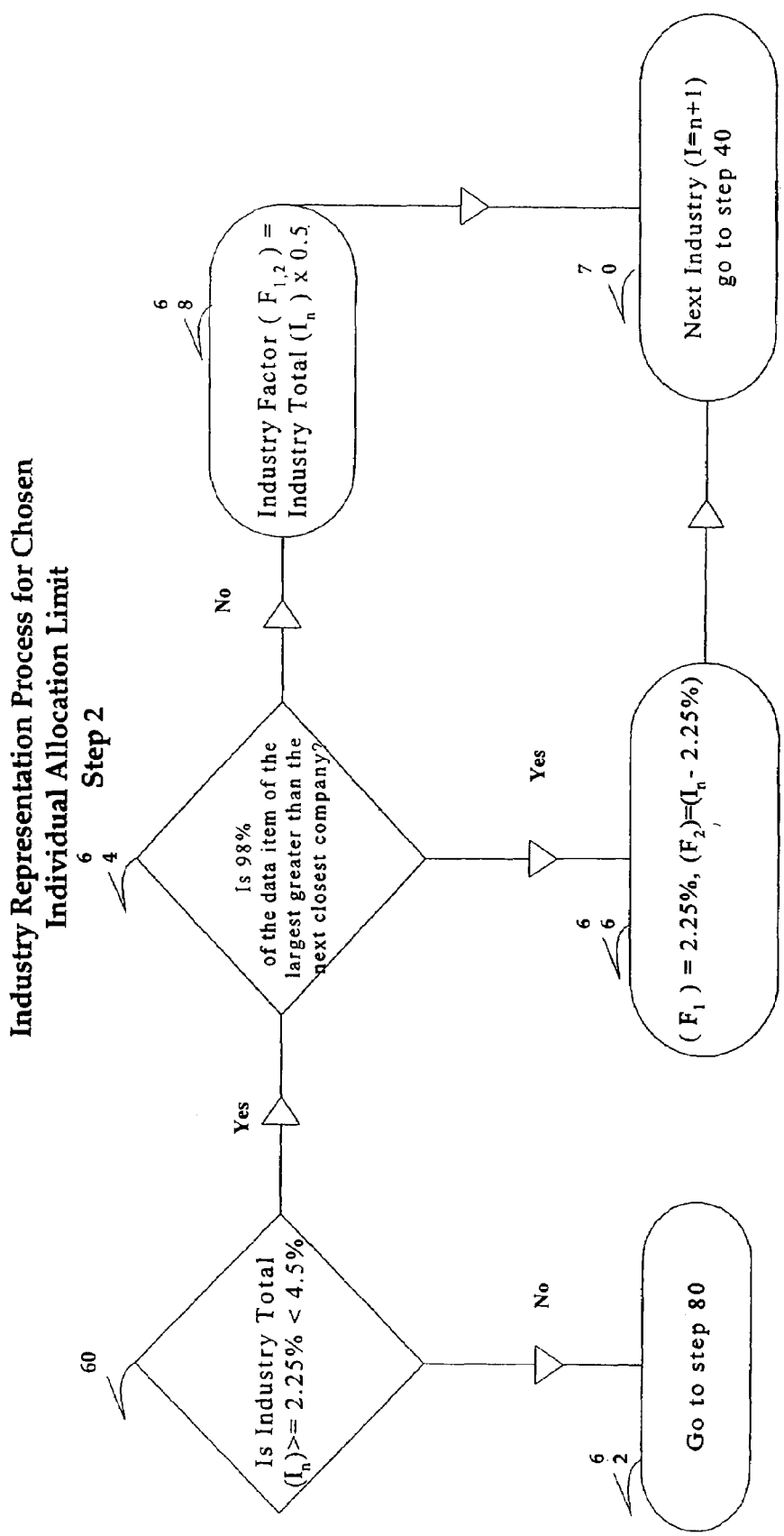

FIG. 4, step 60 would capture industries greater than or equal to 2.25% and less than 4.5%. If the industry is greater than 4.5% the test in step 62 would send the process to step 80, as more fully shown in FIG. 5. Step 64 tests the significance of the leader by the previously defined 2.0%, and if there is no tie the data processing system goes to step 66 and the leader is assigned 2.25% and the next closest company is assigned ($I_n$—2.25%). Step 68 would split the total amount of the industry between the two largest companies in the industry if the 2% significance test is failed and a tie is determined. Step 70 takes the next industry back to step 40.

Figure 5:
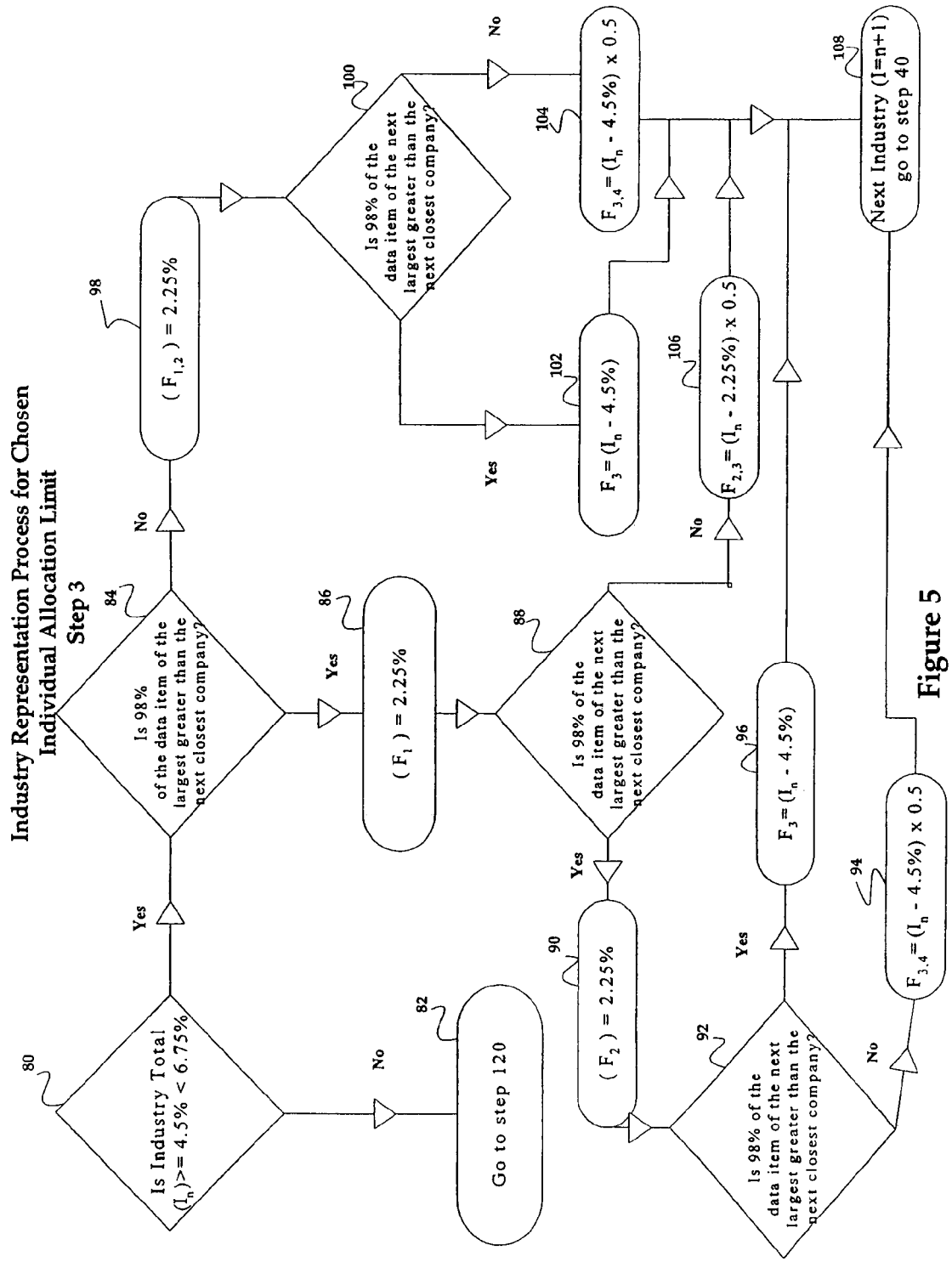

FIG. 5, step 80 captures industries greater than or equal to 4.5% and less than 6.75% of the total portfolio allocation. If the industry is greater than 6.75%, step 80 would send the process to step 82 and be forwarded to step 120. Step 84 tests the significance of the leader ($F_1$) by the previously defined 2.0%. If there is no tie and the 2% significance test is passed, the data processing system goes to step 86 and the leader ($F_1$) is assigned 2.25% and forwarded to step 88 for the 2% significance test between the second ($F_2$) and third ($F_3$) largest companies. Step 90 has the second company ($F_2$) clearing the 2% significance test and gaining the 2.25% limit. Step 92 tests for the 2% significance test between the third ($F_3$) and fourth ($F_4$) largest companies. Step 94 captures a 2% significance test tie and would split the remaining amount of the industry ($I_n$—4.5%) between ($F_3$) and ($F_4$) and forwarded to step 108 and forwarded back to step 40. Step 96 assigns 2.25% to ($F_3$) if the significance test in step 92 is passed and $F_3$ gained the remaining amount of the industry ($I_n$4.5%). Step 98 captures a tie of the step 84 significance test, and assigns $F_1$ and $F_2$ 2.25%. Step 100 is a significance test with step 102 having the third leader $F_3$ capturing the remaining balance of the industry ($I_n$—4.5%). From step 102 the data processing system forwards to step 108 and to be sent back to step 40. Step 104 represents a tie between $F_3$ and $F_4$ and allocates a split of the remaining balance of the industry ($I_n$—4.5%) and forwarded to step 108. If step 106 determines a tie between F2 and F3, the second and third securities with the largest equity, the remaining balance of the industry allocation minus the 2.25% limit ($I_n$—2.25%) is, split equally between F2 and F3, before the process moves to step 108.

Figure 6:
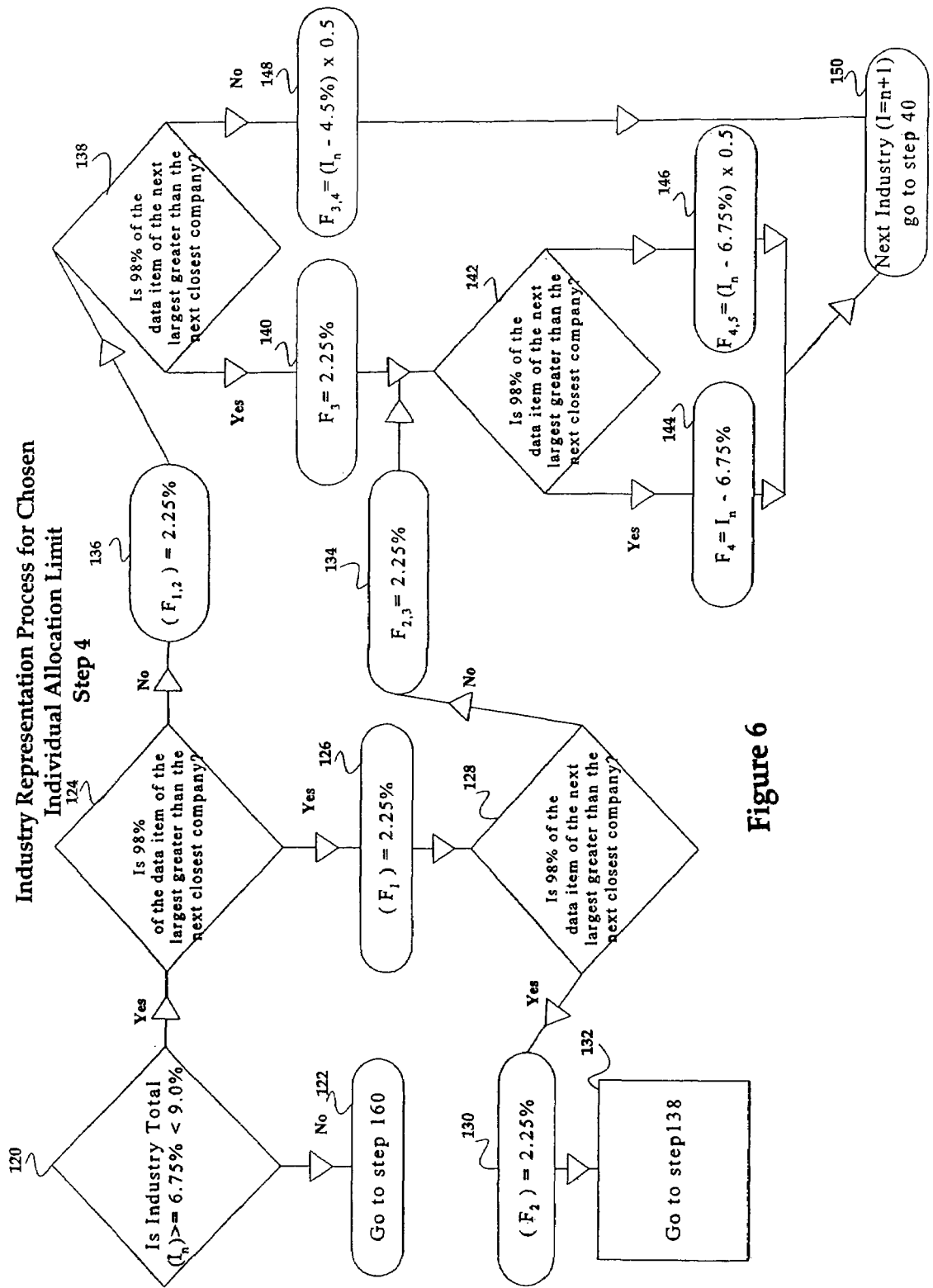

FIG. 6, step 120 captures industries greater than or equal to 6.75% and less than 9.0% of the total portfolio allocation. If the industry is greater than 9.0%, step 120 would send the process to step 122 and be forwarded to step 160. Step 124 tests the significance of the leader ($F_1$) by the previously defined 2.0%. If there is no tie and the 2% significance test is passed, the data processing system goes to step 126 and the leader ($F_1$) is assigned 2.25% and forwarded to step 128 for the 2% significance test between the second ($F_2$) and third ($F_3$) largest companies. Step 130 has the second company ($F_2$) clearing the 2% significance test and gaining the 2.25% limit and forwarded to step 132 and on to step 138. Step 134 assigns the tie between $F_2$ and $F_3$ 2.25%, and forwarded to step 142. Step 136 captures the tie between $F_1$ and $F_2$ and assigns a value of 2.25%, and forwards to step 138. Step 138 tests for the 2% significance test between the third ($F_3$) and fourth ($F_4$) largest companies. Step 148 captures a 2% significance test tie and would split the remaining amount of the industry ($I_n$—4.5%) between ($F_3$) and ($F_4$) and forwarded to step 150 and forwarded back to step 40. Step 140 assigns 2.25% to ($F_3$) if the significance test in step 138 is passed. Step 142 is a significance test with step 144 having the fourth leader $F_4$ being assigned the remaining balance of the industry ($I_n$—6.75%). From step 144 the data processing system forwards to step 150 to be sent back to step 40. Step 146 represents a tie between $F_4$ and $F_5$ and allocates a split of the remaining balance of the industry ($I_n$—6.75%) and forwarded to step 150.

Figure 7:
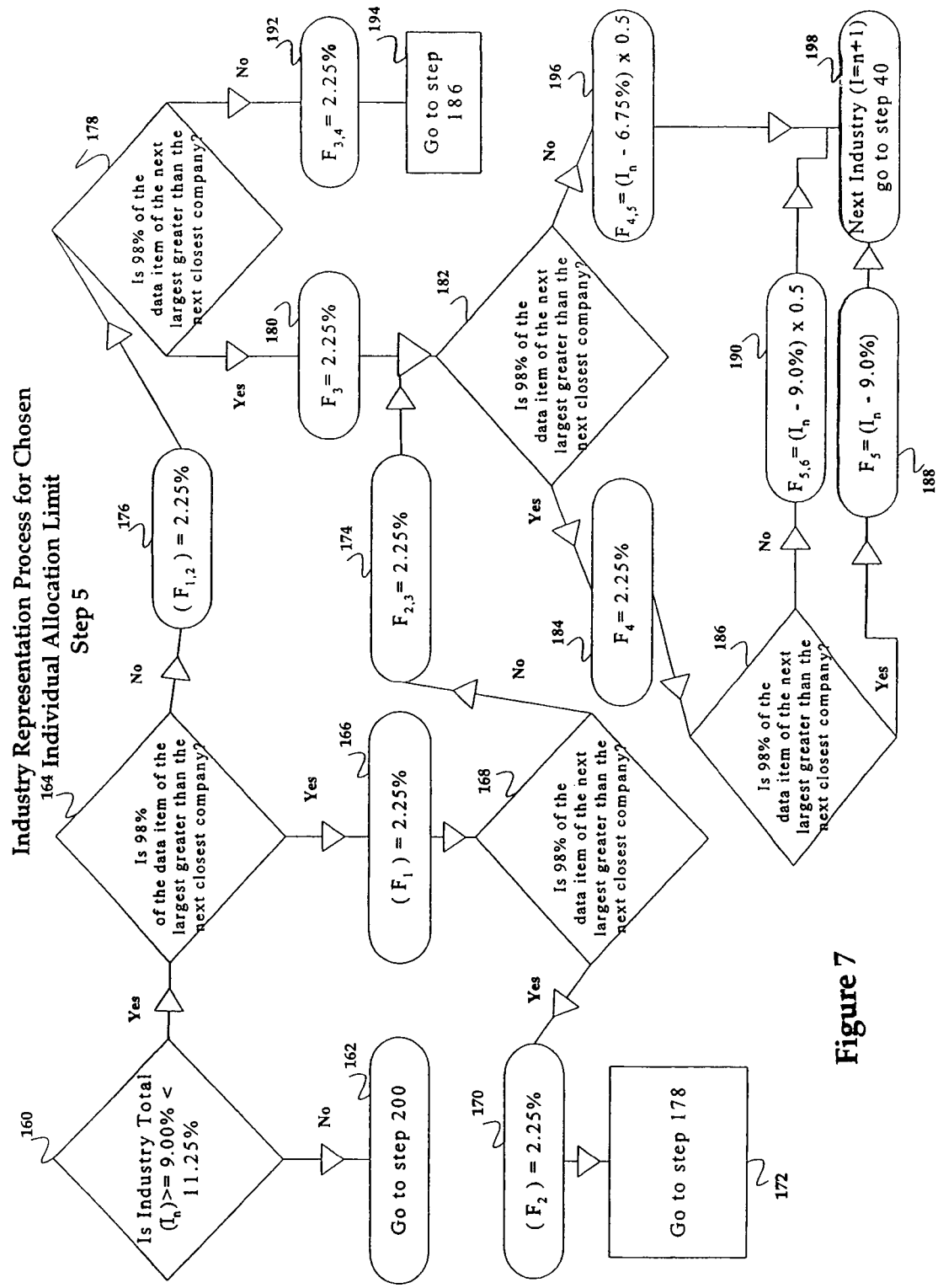

FIG. 7, step 160 captures industries greater than or equal to 9.0% and less than 11.25% of the total portfolio allocation. If the industry is greater than 11.25%, step 160 would send the process to step 162 and be forwarded to step 200. Step 164 tests the significance of the leader ($F_1$) by the previously defined 2.0%. If there is no tie and the 2% significance test is passed, the data processing system goes to step 166 and the leader ($F_1$) is assigned 2.25% and forwarded to step 168 for the 2% significance test between the second ($F_2$) and third ($F_3$) largest companies. Step 170 has the second company ($F_2$) clearing the 2% significance test and gaining the 2.25% limit and forwarded to step 172 and on to step 178. Step 174 assigns the tie between $F_2$ and $F_3$ 2.25%, and forwarded to step 182. Step 176 captures the tie between $F_1$ and $F_2$ and assigns a value of 2.25%, and forwards to step 178. Step 178 tests for the 2% significance test between the third ($F_3$) and fourth ($F_4$) largest companies. Step 192 captures a 2% significance test tie and would assign 2.25% to both ($F_3$) and ($F_4$) and forwarded to step 194. Step 180 assigns 2.25% to ($F_3$ if the significance test in step 178 is passed. Step 182 is a significance test with step 184 having the fourth leader $F_4$ being assigned 2.25%. From step 184 the data processing system forwards to step 186 to apply the significance test to $F_5$ and $F_6$. Step 190 represents a tie between $F_5$ and $F_6$, and allocates a split of the remaining balance of the industry ($I_n$—9.0%) and forwarded to step 198. Step 196 identifies a tie between F4 and F5, the fourth and fifth largest companies, and allocates a split of the remaining balance of the industry ($I_n$—6.75%) there between, before the process moves to Step 198. Step 188 captures a clearance of the significance test and assigns $F_5$ the balance of the industry allocation ($I_n$—9.0%). Step 198 takes the process back to step 40.

Figure 8:
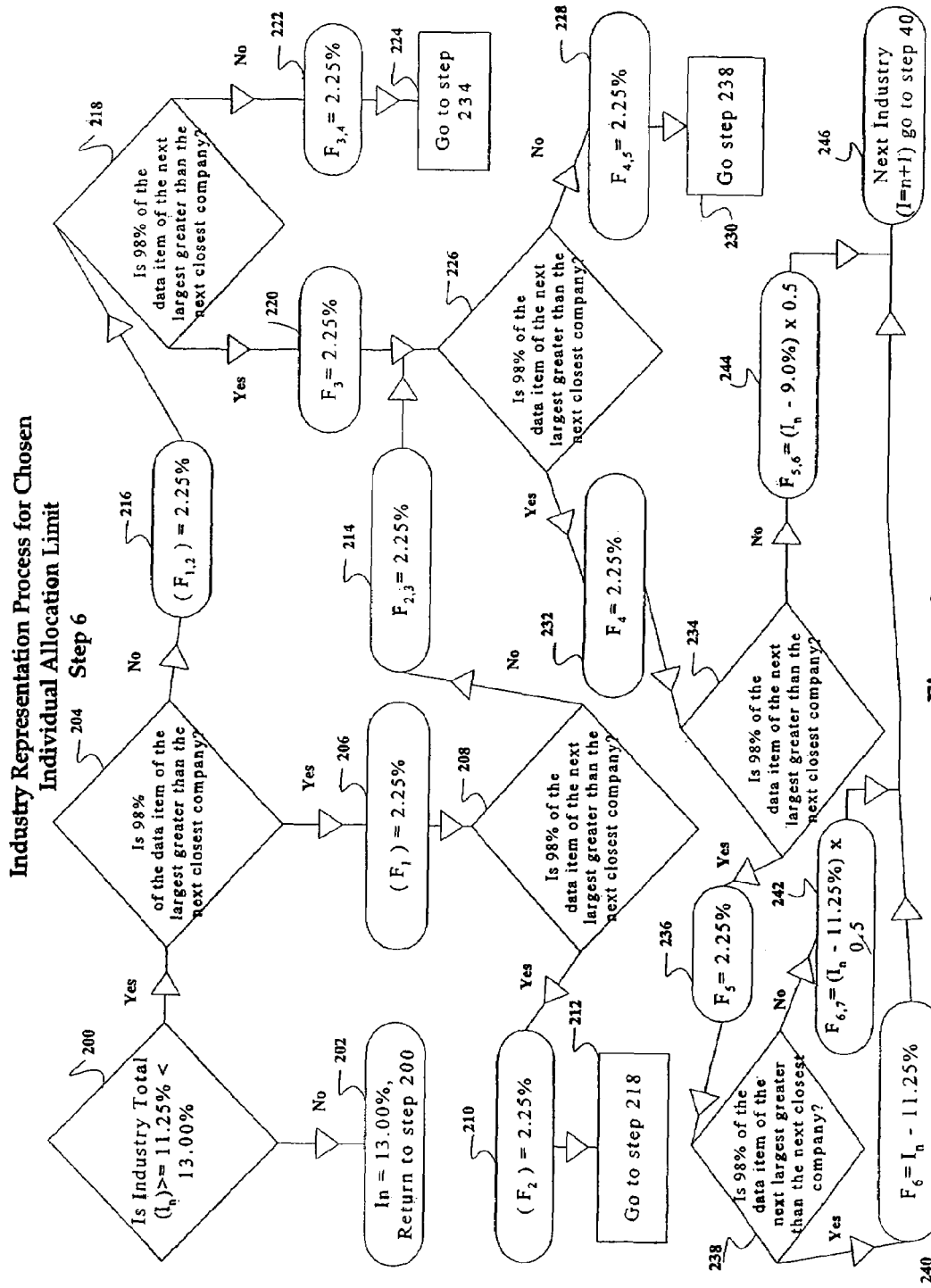

FIG. 8, step 200 captures industries greater than or equal to 11.25% and less than 13.00% of the total portfolio allocation. If the industry is greater than 13.00%, step 202 would assign a limit on 13% to the industry and be returned back to step 200 with $I_n$=13.00% (this size limit is included in this illustrative embodiment, but may be removed for other applications), Step 204 tests the significance of the leader ($F_1$) by the previously defined 2.0%. If there is no tie and the 2% significance test is passed, the data processing system goes to step 206 and the leader ($F_1$) is assigned 2.25% and forwarded to step 208 for the 2% significance test between the second ($F_2$) and third ($F_3$) largest companies. Step 210 has the second company ($F_2$) clearing the 2% significance test and gaining the 2.25% limit and forwarded to step 212 and on to step 218. Step 214 assigns the tie between $F_2$ and $F_3$ 2.25%, and forwarded to step 226. Step 216 captures the tie between $F_1$ and $F_2$ and assigns a value of 2.25% to each company, and forwards to step 218. Step 218 tests for the 2% significance test between the third ($F_3$) and fourth ($F_4$) largest companies. Step 222 captures a 2% significance test tie and would assign 2.25% to both ($F_3$) and ($F_4$) and forwarded to step 224 and be forwarded to step 234. Step 220 assigns 2.25% to ($F_3$) if the significance test in step 218 is passed. Step 226 is a significance test between $F_4$ and $F_5$ with step 232 having the fourth leader $F_4$ clearing the significance test and being assigned 2.25%. Step 228 assigns $F_4$ and $F_5$ 2.25% and is forwarded to step 230 and on to step 238. Step 234 applies the significance test to $F_5$ and $F_6$. Step 244 represents a tie between $F_5$ and $F_6$, and allocates a split of the remaining balance of the industry ($I_n$—9.0%) and forwarded to step 246. Step 236 captures a clearance of the significance test of step 234 and assigns $F_5$—2.25% and forwards the process to step 238 for a significance test between $F_6$ and $F_7$. If $F_6$ clears the significance test of step

238, it is assigned the balance of the industry ($I_n$—11.25%) in step 240 and sent go step 246. Step 242 allocates the step 238 significance tie to $F_6$ and $F_7$ with a split of the remaining balance ($I_n$—11.15%). Step 246 takes the process back to step 40.

FIG. 9 illustrates an algorithmic example of the illustrative embodiment, with an algorithmic example of the industries of the embodiment found in FIGS. 10a and 10b. When the data processing system is run, the following allocations of the illustrative embodiment are made to the respective companies as shown in FIG. 10.

FIG. 11 illustrates the simple process of assigning each company of the chosen universe. If the more detailed portfolio is chosen by the investment manager, the data processing system would assign in step 300 the individual company's relative percent to the entire universe. Step 302 would include all members of the defined universe, and a large portfolio would be created.

HISTORICAL PERFORMANCE OF THE INVENTION

Using the Illustrative Embodiment

The following table compares the actual performance of the STANDARD and POOR'S® BARRA VALUE INDEX® (D("S&P Barra Value") and the RUSSELL 1000 VALUE INDEX® ("Russell 1000 Value"), with the hypothetical results of the illustrative embodiment of the invention (common shareholders equity) for various historical periods. Total returns of the Strategy Model are returns on a hypothetical portfolio whose results have been approved by the SEC that are included in a Prospectus for a mutual fund composed of stocks selected by the Strategy Model (common shareholders equity) and re-balanced monthly.

The S&P Barra Value and the Russell 1000 Value are indexes that have no costs or expenses of operation, however, its total return amounts reflect reinvestment of dividends for purposes of general comparison to this invention.

COMPARATIVE HISTORICAL TOTAL RETURN PERFORMANCE OF THIS INVENTION

Please note that past results of this embodiment do not necessarily indicate future performance or earnings of the invention

| Period | Industry Leaders Strategy | S&P Barra Value Index ® | Russell 1000 Value Index ® |
| --- | --- | --- | --- |
| 1 year<br>Dec. 31, 1998–Dec. 31, 1999 | 10.89% | 12.69% | 7.66% |
| 3 years<br>Dec. 31, 1996–Dec. 31, 1999 | 22.33% | 18.87% | 18.94% |
| 5 years<br>Dec. 31, 1994–Dec. 31, 1999 | 26.34% | 22.93% | 23.15% |
| 10 years<br>Dec. 31, 1999–Dec. 31, 1999 | 17.26% | 15.36% | 15/63% |
| 13 Years<br>Dec. 31, 1986–Dec. 31, 1999 | 16.94% | 15.90% | 15.87% |

The invention claimed is:

1. A computer-implemented method of allocating funds in an investment portfolio, comprising:
   (a) selecting a financial data element by which to measure a value of a set of publicly traded securities;
   (b) selecting a universe of securities from the set of all publicly traded securities;
   (c) calculating the total size of the entire universe of securities by summing the values of each security in the universe of securities,
   (d) assigning an industry classification to each security in the universe of securities and assigning each security into an industry group based on the industry classification;
   (e) calculating, using the data processing system, an industry size for each industry group for which at least one security in the universe of securities has been classified into the industry group by summing the values of the securities assigned to the industry group;
   (f) calculating, using the data processing system, relative industry size for each industry group for which at least one security in the universe of securities has been classified into the industry group by dividing the industry size for the industry group by the population size of the entire population of securities;
   (g) generating, using the data processing system, an industry allocation for the funds in an investment portfolio such that the total percentage of the funds in the portfolio which will be invested in securities assigned to a particular industry group is based on the relative industry size of the industry group; and
   (h) generating, using the data processing system, a list of securities in which to invest the funds in an investment portfolio such that the number of securities selected for investing from a particular industry group is based on the relative industry size of the industry group.

2. The method of claim 1 wherein the number of securities selected for investing from a particular industry group based is selected by comparing the relative industry size of the industry group to a first upper limit and, if less or equal to the first upper limit, investing in at most two securities assigned to the industry group, and, if greater than the first upper limit, investing in at least two securities assigned to the industry group.

3. The method of claim 2 wherein the number of securities selected for investing from a particular industry group based is further selected by comparing the relative industry size of the industry group to a second upper limit and, if less than or equal to the second upper limit, investing in at most three securities assigned to the industry group, and, if greater than the second upper limit, investing in at least three securities assigned to the industry group.

4. The method of claim 3 wherein the first upper limit is equal to 2.25% and the second upper limit is equal to 4.5%.

5. The method of claim 2, wherein the first upper limit is equal to 2.25%.

6. The method of claim 1 wherein step (h) further comprises:
   (i) calculating the relative security value for each security in the universe of securities by dividing the security value of the security by the total size of the entire universe of securities,
   (ii) ranking the securities in each industry group by relative security value, and
   (iii) selecting particular securities in which to invest the funds in an investment portfolio based on the rankings of the securities by relative security value.

7. The method of claim 6 wherein step (iii) further comprises comparing the relative security value of each security selected for investing to the relative security value of its adjacently ranked security and, if they are substantially the same, investing an equal percentage of the funds in the portfolio in each of the two securities.

8. The method of claim 7, wherein two securities are determined to be substantially the same if 98% of the value of the larger of the two securities is greater than the value of the smaller of the two securities.

9. The method of claim 6, wherein the particular securities with the highest rankings within each industry group are selected for investing.

10. The method of claim 1 further comprising:
(i) limiting the percentage of funds allocated to an industry group to a predefined maximum percentage of funds in the investment portfolio regardless of the calculated relative industry size.

11. The method of claim 10 wherein the percentage of funds allocated to an industry group is limited to a maximum percentage of 13%.

12. The method of claim 1 further comprising:
(i) limiting the percentage of funds allocated to a particular security to a predefined maximum percentage of funds in the investment portfolio regardless of the calculated relative industry size.

13. The method of claim 12 wherein the percentage of funds allocated to a particular security is limited to a maximum percentage of 2.25%.

14. The method of claim 1 wherein steps (a)–(h) are repeated at periodic time intervals.

15. The method of claim 1 wherein the financial data element is selected based on a desired investment style.

16. The method of claim 1 wherein the financial data element is common shareholders equity.

* * * * *